July 25, 1950 D. EVERS 2,516,375
CAN OPENING AND SPOUT FORMING DEVICE
Filed Feb. 27, 1948
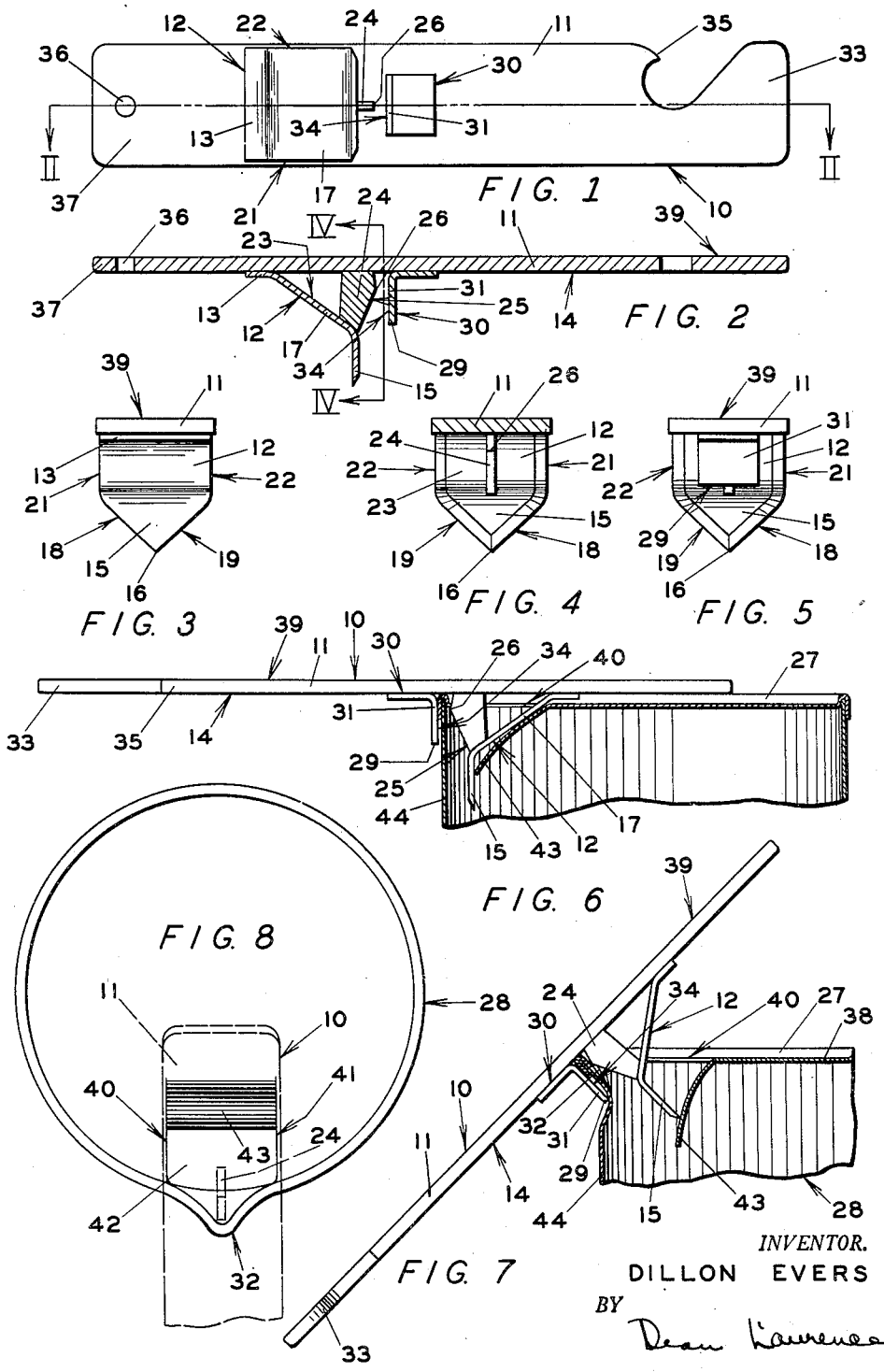
INVENTOR.
DILLON EVERS
BY Dean Lawrence
ATTORNEY Patented July 25, 1950

2,516,375

UNITED STATES PATENT OFFICE 2,516,375

CAN OPENING AND SPOUT FORMING DEVICE

Dillon Evers, East Lansing, Mich.

Application February 27, 1948, Serial No. 11,457

4 Claims. (Cl. 7—14.2)

This invention relates in general to a can opener and more specifically to a type thereof by means of which a spout may be formed in the rim of a can.

Persons familiar with the use and operation of kitchen utensils have long recognized that such utensils must be simple to use and require a minimum of force to operate. The average woman in the home or commercial kitchen does not have time for intricate and/or elaborate utensils. Furthermore, she does not usually have the excessive strength in her wrists often required to operate those types of combination can opening and spout forming devices presently known to exist.

Accordingly, a primary object of this invention is to provide a combination can opening and spout forming device which works easily and effectively but which does not require excessive strength to operate.

A further object of this invention is to provide a device, as aforesaid, which is operable with either large or small cans, and which is applicable to cans, with or without raised rims.

Other objects and purposes of this invention will become apparent to those who are acquainted with this type of equipment upon reading the following description and upon referring to the accompanying drawings.

In order to meet the objects and purposes mentioned above, as well as others incidental thereto and arising therefrom, I have provided a combination can opening and spout forming device having a flat, elongated, rectangular handle and a blade secured to and extending from a flat side of said handle, intermediate its longitudinal extremities. A guide stop is secured to said handle adjacent to and spaced from said blade.

For illustrations of a particular, preferred embodiment of the invention, attention is directed to the accompanying drawing in which:

Figure 1 is a bottom plan view of the combination can opening and spout forming device to which this invention relates.

Figure 2 is a sectional view of Figure 1 taken along the line II—II.

Figure 3 is an end elevation view of the said device, taken from the leftward end as appearing in Figure 1.

Figure 4 is a sectional view taken along the line IV—IV of Figure 2.

Figure 5 is an end elevation view of the said device taken from the rightward end as appearing in Figure 1.

Figure 6 is a side elevation view of the device and a vertical, central cross sectional view of a can, showing the said device in operative engagement with said can.

Figure 7 is a side elevation view of the said device in a different position with respect to said can than shown in Figure 6.

Figure 8 is the top plan view of said can after an opening and a spout have been formed in the top thereof with the device shown in phantom.

Construction

As illustrated in Figures 1, 2, 3, 4 and 5, the can opening and spout forming device 10, hereinafter referred to as the opener, has a flat, elongated, substantially rectangular handle 11, which may be fabricated from a rigid strip of suitable material such as steel.

A cutting blade 12 is secured at the end 13 to the handle bottom 14 of said handle 11, intermediate the longitudinal extremities thereof. The puncturing tip 15 of said blade, which is tapered to a point 16, is preferably, but not necessarily, perpendicular to said handle 11. A cutting blade body 17, which is integral with said puncturing tip 15, extends therefrom to said handle bottom 14. Said cutting body is inclined to both the puncturing tip 15 and the handle bottom 14 at such an angle as may be required or desired. The cutting blade 12, which is approximately as wide as the handle 11, is fabricated from a hard metal, such as steel, so that it will hold a good cutting edge.

The entire, exposed edge of the blade 12, including the tapered edges 18 and 19 of the puncturing tip 15 and the longitudinal cutting body edges 21 and 22 of the blade body 17, are beveled and sharpened. The bevel along the edges 21 and 22 of the cutting body 17 is preferably on that side 23 of the blade 12 adjacent to the handle bottom 14. The bevel along the tapered edges 18 and 19 is advantageously on the same side of the blade 12 as the bevel along the cutting body edges 21 and 22.

A gripping bar 24 (Figures 2 and 4) extends perpendicularly between, and is rigidly secured at its extremities to, the handle bottom 14 and the side 23 of the cutting body 17. The securement of the gripping bar 23 and the cutting blade 12 to each other and to the handle bottom 14 may be accomplished in any convenient conventional manner, such as by welding, soldering or brazing. The gripping bar 24 is preferably in line with the longitudinal axis of the handle 11 and preferably engages said handle midway between the longitudinal edges thereof.

The gripping bar edge 25, remote from the cutting body 17, is shaped to protrude intermediate its longitudinal extremities thereby creating a gripping bar point 26. The gripping point 26 is preferably a little farther from said handle bottom 14 than the depth of the rim 27 on a conventional, rimmed can 28, as shown in Figures 6 and 7.

A guide stop 30, which, for example, may comprise a strip of rigid sheet metal bent into a 90 degree angle, is secured to the handle bottom 14 so that the outside face 34 of the extended flange 31 of said guide stop is opposed to the gripping bar edge 25 and spaced therefrom. The extended flange 31 is preferably, but not necessarily, perpendicular to the longitudinal axis of said handle and engages said handle midway between the longitudinal edges thereof.

The flange 31 advantageously extends away from said handle bottom about the same distance as the gripping bar 24, in this particular embodiment of the invention. The length of the spout 32 (Figures 7 and 8) is determined by the perpendicular distance between the outer free edge 29 of the flange 31 and the handle bottom 14. The amount of force required to depress the handle outer end 33, when the opener 10 is operatively engaged with the can 28, is dependent upon the length of the flange 31 and the distance between the flange outer face 34 and the gripping bar point 26. This distance is preferably just large enough to receive slidably the rim 27 of an average metal can 28.

The outer end 33 of the handle 11 may be cut away to provide a bottle opening hook 35. An opening 36 may be provided in the inner end 37 of the handle 11, by means of which the opener may be suspended.

Operation

In order to operate the opener 10, hereinbefore described, the handle 11 is held in a substantially horizontal position while the blade point 16 is placed upon a can top 38 adjacent to the rim 27. The puncturing tip 15 of the blade 12 is preferably held substantially tangential to the said rim at a point adjacent to the blade point 16. The handle top 39 may then be pressed or struck with the palm of the hand, or any other convenient means, until that portion of the handle bottom 14 between the gripping bar 24 and the guide stop 30 is resting upon the rim 27 of the cap 28 (Figure 6). In the case of a rimless can, such as a condensed milk can, not shown, the blade point 16 is placed upon the rimless can top near the edge of the top and the remainder of the procedure is the same as though the can had a rim.

After the blade point 16 pierces the can top 38, the sharpened, tapered edges 18 and 19 of the puncturing tip 15 of said cutting blade 12 widen the breach along the rim 27 until said breach is as wide as the blade 12. Then the sharpened body edges 21 and 22 produce the cuts 40 and 41 in the can top 38 (Figure 8) which cuts become the lateral, parallel edges of the can top opening 42.

The perpendicular distance between the puncturing tip 15 and the flange outer face 34 is advantageously greater than the perpendicular distance between the gripping point 26 and said flange outer face so that the flange free edge 29 does not strike the rim 27 of the can 28 as the cutting blade 12 is depressed through the can top 38. The gripping bar edge 25 engages the can rim 27 when the blade 12 has pierced the can top 38 to the depth of the cutting body 17. As the blade 12 cuts further into the can top 38, the gripping edge 25 brings the flange 31 closer to the adjacent can rim 27, and at the same time causes the cutting blade 12 to increase the length of the can top opening 42.

A tongue 43, integral with the can top 38, is created between the cuts 40 and 41 in said can top by the blade 12. The tongue 43 is forced downwardly within said can and away from the rim 27 by the cutting body 17 (Figure 6). When the handle outer end 33 is depressed, the puncturing tip 15 forces the tongue 43 further away from the can side wall 44 (Figure 7) and below the rim 27, thereby preventing its obstruction of the opening 42.

While the handle 11 is being moved from the horizontal position (Figure 6) to the tilted position (Figure 7), the gripping bar 24 stretches the rim 27 and the adjacent portions of the can side wall 44 into a spout 32. Said spout, so formed, extends outwardly and downwardly beyond the normal position of the rim 27 and side wall 44. As shown in Figure 8, the gripping bar 24 engages said rim at a point midway between the cuts 40 and 41 in the can top 38.

The resistance of said tongue 43 to bending by the blade 12 implements the formation of the spout 32 by the gripping bar 24 when the handle 11 is tilted. The gripping bar point 26 grips the inside surface of the can wall 44 and prevents the opener 10 from slipping off of the can 28 during the spout forming operation. The outer free edge 29 of the extended flange 31 of the guide stop 30 bears against the outside surface of the can side wall 44 during the spout forming operation (Figure 7) and crushes the can side wall 44 inwardly as the opener 10 is operably rotated, as aforesaid. The spout 32 is formed above the contact point between the free edge 29 of said flange 31 and the can side wall 44.

When the spout forming operation has been completed, the opener 10 is disengaged from said can 28 by pulling the handle 11 away from the can in a direction substantially perpendicular to the bottom 14 thereof. It will be observed that for a can of any given material the force required to form the spout 32 is a function of the comparative length of the extended flange 31 and the distance from the extended flange 31 to the handle outer end 33. The length of the handle 11 may be varied as desired or required to obtain the most favorable conditions for producing the spout 32.

The amount of rotation required to produce a satisfactory spout 32 is dependent upon the clearance between the gripping bar point 26 and the flange outer face 34 with respect to the thickness of the can rim 27, or can side wall 44 in the case of a rimless can. The greater this clearance distance is, the more the can opener handle 11 must be rotated away from the horizontal position before the gripping point 26 and flange free edge 29 engage opposite sides of the can rim 27 and/or can side wall 44. An excessive rotation is also required to form a proper spout 32 if said clearance is unnecessarily large. After the can top opening 42 has been formed by the opener 10, the blade point 16 may be used to provide an air vent in said can top diametrically opposite to the said opening 42.

Although the above mentioned drawings and

I claim:

1. In a device for opening the top of a can and forming a spout in the rim of said can, the combination comprising: a flat, elongated, rigid, rectangular handle; a cutting blade secured to a flat side of said handle intermediate its extremities, said blade having a puncturing tip perpendicular with respect to said handle, tapered to a point and beveled to a cutting edge along said taper, and said blade having a cutting body extending between said tip and said handle, said body being angularly disposed to said handle and having beveled longitudinal cutting edges; a gripping bar extending perpendicularly between, and being rigidly secured to, said handle and the cutting body of said cutting blade, said gripping bar having a gripping bar point intermediate its extremities and extending away from said cutting body; and a guide stop extending from and secured to said handle, adjacent to and spaced from said gripping bar point a distance such that said can rim may be snugly and slidably received between said guide stop and said gripping bar point; whereby, when an opening is effected by said blade in the top of said can adjacent to the rim thereof, a portion of said handle extends beyond the rim of the can and the said rim is slidably received between the said guide stop and the said gripping point and said rim is gripped between said guide stop and said gripping bar when the extended portion of said handle is depressed, thereby stretching said rim out of its normal shape to form a spout adjacent to said opening.

2. In a device for puncturing an opening in a can top next to the wall of the can and forming a spout in said wall adjacent to said opening, the combination comprising: a flat, rigid, elongated handle; a cutting blade having one end secured to said handle, having another end pointed and perpendicular to said handle and having an intermediate portion between said ends and angularly disposed to said handle, said cutting blade having beveled and sharpened edges around its entire periphery except at said one end; a gripping bar secured to said handle and said blade intermediate portion, and having a gripping point remote from said blade intermediate portion; and a guide stop secured to said handle adjacent to and spaced from said gripping bar point; whereby said handle extends beyond said can wall as said cutting blade completes said opening in said can top, said can wall is gripped between said guide stop and said gripping bar point, and said wall is stretched to form a spout when the extended portion of said handle is depressed.

3. In a device for puncturing an opening in the top of a rimmed metal container and forming a spout in the rim adjacent to said top, the combination comprising: a handle; a cutting blade secured to and depending from said handle; a gripping means attached to both said handle and said cutting blade; and a guide stop secured to and depending from said handle adjacent to said gripping means; said gripping means having a gripping point protruding towards said guide stop and spaced from said handle and said cutting blade; said gripping point spaced from said guide stop a distance equal to the thickness of the rim of said container, whereby the rim of said container may be gripped between said guide stop and said gripping means as the said cutting blade opens said container and a spout is created in said rim next to said opening when said handle is rotated about the lower end of said guide stop.

4. In a device for puncturing an opening in the top of a closed container having a rim and forming a spout in the side wall of said container adjacent to said opening, the combination comprising: a handle having a flat side; a cutting blade having one end secured to said flat side of said handle and having another end pointed and depending substantially perpendicularly from said handle, said blade being sharpened along its exposed edges; a gripping means secured to said handle adjacent to said cutting blade for engaging said container side wall; said gripping means having a gripping point protruding away from said cutting blade; a guide stop secured to and depending from said handle adjacent to said gripping means; said guide stop having a free end remote from said handle, said free end including a sharp corner for engaging the side wall of said container; said guide stop spaced from said gripping point a distance equal to the thickness of said rim of said container, whereby said gripping point and said sharp corner at said free end of said guide stop engage the side wall of said container for forming a spout as said device is rotated outwardly from said container about said free end of said guide stop.

DILLON EVERS.

REFERENCES CITED

The following references are of record in the file of this patent:

UNITED STATES PATENTS

| Number | Name | Date |
|---|---|---|
| 1,232,948 | Marchand | July 10, 1917 |
| 1,678,112 | Frost | July 24, 1928 |
| 2,036,296 | Pisani | Apr. 7, 1936 |
| 2,216,110 | Hothersall | Oct. 1, 1940 |
| 2,232,123 | Luppert | Feb. 18, 1941 |

FOREIGN PATENTS

| Number | Country | Date |
|---|---|---|
| 317,488 | Great Britain | Aug. 16, 1929 |